INVENTOR.
CLAIRE R. WAINWRIGHT

INVENTOR.
CLAIRE R. WAINWRIGHT

Fig. 8.

United States Patent Office 3,427,536
Patented Feb. 11, 1969

3,427,536
SYSTEM FOR INCREASING FREQUENCY
SPECTRUM OF SWEEP GENERATOR
MARKER SIGNAL
Claire R. Wainwright, Laguna Beach, Calif., assignor to Telonic Industries, Inc., a corporation of Indiana
Filed Dec. 11, 1964, Ser. No. 417,576
U.S. Cl. 324—57
Int. Cl. G01r 27/00
14 Claims

ABSTRACT OF THE DISCLOSURE

A marker system for a sweep generator which reduces the portion of the sweep width of the sweep generator occupied by the marker signal. Plural multiplier and frequency mixer stages coupled to the sweep oscillator progressively widen the frequency spectrum of the marker signal. Accordingly, a few Hertz change in the sweep frequency above and below the selected marker frequency produces a marker signal comprised of a broad frequency spectrum.

---

The present invention relates to sweep generators and more particularly to a marker system for a sweep generator.

The sweep generator is a device designed to replace the signal generator for performing tests to obtain amplitude versus frequency characteristics of circuitry being designed, aligned, tested, etc. Sweep generators can be used for many assorted tests such as oscillator stability checks and spectrum analysis. Perhaps the most commonly used application of a sweep generator is the displaying on an oscilloscope of amplitude versus frequency characteristics of an unknown circuit. The output of the sweep generator is coupled to the device under test causing the device under test to have an output which is detected and displayed on the vertical axis of an oscilloscope. The output of the sweep generator is a varying frequency which varies linearly with respect to time about a center frequency and between two outside frequencies $f1$ and $f2$. The horizontal input of the oscilloscope is received directly from the sweep generator and more particularly from the rate generator of the sweep generator.

The rate generator is usually considered a part of the internal circuitry of the sweep generator and functions to provide a properly phased oscilloscope horizontal drive, to provide the sweep oscillator drive, and to provide the sweep oscillator blanking signals. Of course, the "sweep drive" or "sweep oscillator drive" refers to the voltage provided by the rate generator for controlling the output frequency of the sweep oscillator. The oscilloscope horizontal drive is a triangular voltage in phase with the linearly varying output frequency of the sweep generator whereby the display on the scope is the amplitude frequency characteristic bandpass of the device under test.

An accurate interpretation of the response curve displayed requires that the frequency at each point along the curve be known. This information is obtained by the introduction of frequency markers. Thus, instead of coupling the output of the detector directly to the vertical input of the oscilloscope, the output is fed back to the sweep generator where an internally generated marker is added to the signal and the sum of both signals displayed on the oscilloscope. The marker frequency is usually identified by a calibrated frequency dial on the sweep generator. The above described sweep generators are well known in the art and are commercially available, one specific example being Model SM2000 with LH2M head, a product of Telonic Industries, Inc., of 60 N. 1st Ave., Beech Grove, Ind.

One of the problems presented in such commercially available equipment is the accuracy and width of the marker. There are various types of markers, two of which are known as pulse and absorption. A third type of marker is generated by mixing a sample of the sweep signal with a crystal controlled or free running CW source. The resulting video beat note is then amplified and shaped. The resulting marker is added to the detected response of the unit under test and added to scope vertical. The shape of such a marker is very similar to the wings of a bird and consequently might be called a winged marker. The above described winged marker is used in the above mentioned specific commercial embodiment.

As suggested, the winged marker "bypasses" the unit under test because it does not pass through the unit under test. That is, it is added to the detected response of the unit under test. Consequently, the winged marker does not affect the response of the circuit under test; the marker is not distorted or destroyed by channeling through a system designed for RF signals, and the shape and size of the marker can be adjusted as desired by controls which have no effect on the unit tested or on other sweep generator functions.

One disadvantage of the present winged marker systems is the considerable portion of the oscilloscope screen occupied by the marker at low frequency operation and/or narrow sweep widths. If the marker is relatively wide, it obscures the picture of the frequency response of the unit being tested. The winged marker cannot be narrowed to any substantial extent by decreasing the bandwidth of amplification of the marker because such decreasing of bandwidth also decreases the amount of energy contained in signal passed resulting in the marker being distorted and losing amplitude and accuracy. In the past it has been deemed absolutely necessary to use pulse markers instead of winged markers in units operating below 1 mc. and with sweep widths below 500 kc. However, the various methods presently used to produce pulse markers have many disadvantages insofar as: Accuracy, stability, reliability and cost. Hence, this method may only be satisfactory in certain limited applications. Consequently, it is a primary object of the present invention to provide a sweep generator incorporating an improved winged marker system embodying a method of controlling marker width without loss of accuracy and thus being usable at frequencies below 1 mc. and sweep widths below 500 kc. as well as at other frequencies and sweep widths.

A further object of the present invention is to provide an improved sweep generator.

Another object of the present invention is to provide an improved marker system for a sweep generator.

Still another object of the present invention is to provide a sweep generator marker system having substantial accuracy throughout a wide range of sweep widths and frequencies.

Related objects and advantages will become apparent as the description proceeds.

The full nature of the invention will be understood from the accompanying drawings and the following description and claims.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
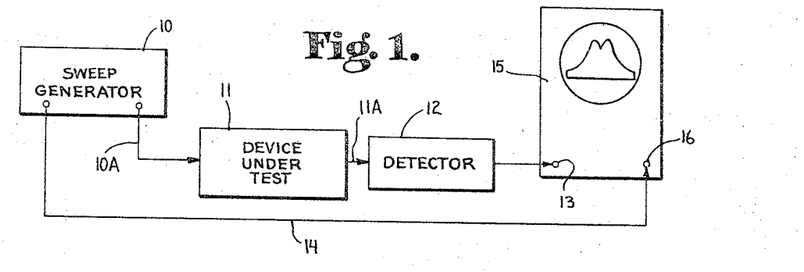
FIG. 1 is a block diagram of a conventional sweep generator test set up.

Referring now more particularly to the drawings, there is illustrated a conventional sweep generator 10, the R-F output 10A of which is coupled to the device under test 11. The output 11A of the device under test is fed into a detector 12 which is in turn coupled to the vertical input 13 of an oscilloscope 15. The horizontal drive 14 of the oscilloscope 15 is provided by the sweep generator 10 to the horizontal input terminal 16 of the oscilloscope 15. The horizontal drive is synchronized with the R-F output so that a single trace from the left side of the scope to the right side of the scope occurs simultaneously with the change in R-F output frequency from the minimum output frequency to the maximum output frequency. The vertical input of the scope receives a constant voltage when the horizontal sweep moves from the maximum output frequency to the minimum output frequency because of the operation of the blanking signal provided by the sweep generator 10.

Figure 2:
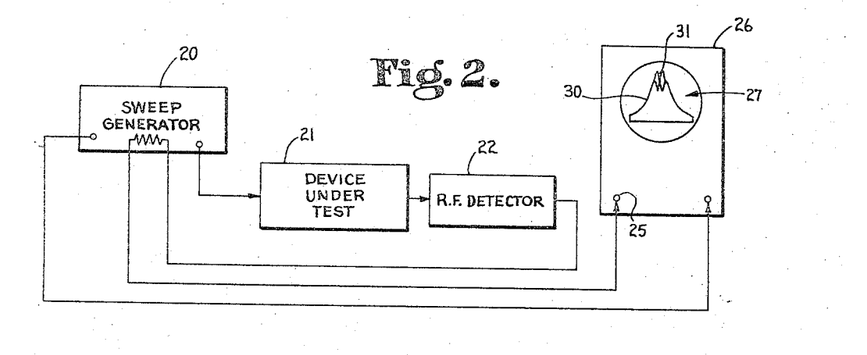
FIG. 2 is a diagram similar to FIG. 1 of a conventional sweep generator incorporating a marker system.

Referring to FIG. 2, the sweep generator 20 provides an R-F output to the device under test 21 whose output is coupled to the R-F detector 22. Instead of direct coupling of the R-F detector to the vertical input 25 of the oscilloscope 26, the R-F detector output is coupled back to the sweep generator 20 where a marker is added to the signal. The signal plus the marker is then placed on the vertical of the oscilloscope as suggested by the display 27 on the oscilloscope which includes the response curve 30 and the marker 31.

Figure 3:
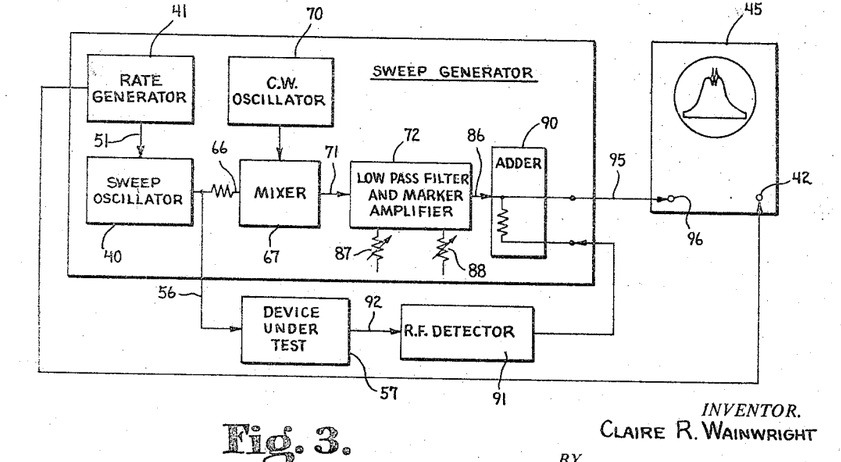
FIG. 3 is a block diagram similar to FIG. 2 but showing additional components of the sweep generator.

FIG. 3 shows further details of the internal components of the sweep generator. Thus, there is provided a sweep oscillator 40 which is controlled by a rate generator 41. The rate generator 41 is coupled to the horizontal input 42 of the oscilloscope 45 to provide the proper linear sawtooth voltage in phase with the linearly varying output frequency of the sweep oscillator. The rate generator 41 controls the sweep oscillator so as to cause it to produce the proper uniformly varying and linearly varying output frequency.

Figure 5:
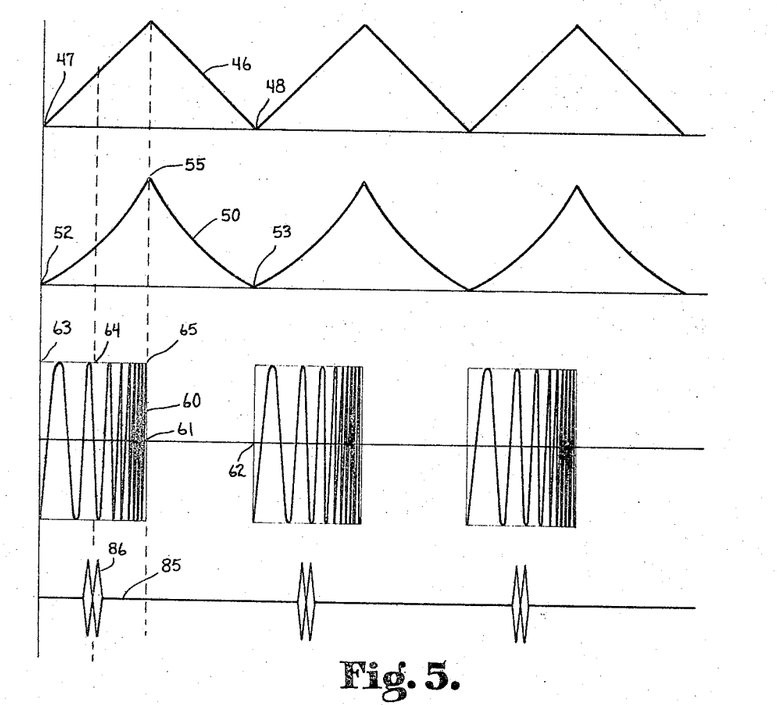
FIG. 5 is a graph showing various output signals of the components of FIG. 3 with portions exaggerated for clarity.

Referring to FIG. 5, the sawtooth 46 represents the voltage provided from the rate generator to the horizontal input 42. The sawtooth 46 is plotted with voltage on the vertical scale and time on the horizontal square with a single one of the sawtooth shapes occupying one-sixtieth of a second as a representative figure. That is, the time from the point 47 to the point 48 is one-sixtieth of a second.

The wave shaped function 50 of FIG. 5 is a representation of the input control 51 from the rate generator to the sweep oscillator, said function 50 being plotted with voltage on the vertical scale and time on the horizontal scale. Thus the time taken from the point 52 to the point 53 is equal to the time from the point 47 to the point 48. As a representative figure, in the above mentioned specific embodiment (Model SM2000) the voltage at point 55 is 120 volts.

Referring to FIG. 3, the output 56 of the sweep oscillator is coupled to the device under test 57. The output 56 is shown by the function 60 of FIG. 5. Of course, the actual frequency in FIG. 5 as well as the change in frequency is greatly exaggerated and expanded horizontally for clarity. The function 60 is plotted with voltage on the vertical scale and the same time calibration on the horizontal scale as in the first two above mentioned functions. It can be seen that from the point 61 to the point 62 there is no output voltage to the device under test. This effect is accomplished by means of the blanking signal provided by the rate generator to the sweep oscillator. In one specific example the frequency of the function 60 at the point 63 is 90 mc., the center frequency at 64 is 100 mc. and the maximum frequency of the function 60 is 110 mc. at the point 65.

A sample of the output of the sweep oscillator is coupled at 66 to a mixer 67 which also receives the constant frequency output of a CW oscillator 70. The output frequency of the CW oscillator 70 is variable between the two outside frequencies, $f1$ and $f2$, that is the maximum and minimum frequency of the sweep oscillator. Assuming for the moment that the CW oscillator is set at 100 mc., it can be appreciated that the difference frequency output of the mixer 67 will be zero each time the sweep oscillator passes through 100 mc. The output 71 of the mixer 67 is fed into a low pass filter and marker amplifier 72. The component 72 is constructed to pass all frequencies below 200 kc. as a representative figure but to block all higher frequencies. Thus, each time the input frequency to the mixer from the sweep oscillator nears the frequency of the CW oscillator the filter and amplifier 72 will pass a signal shaped like the signal 80 in FIG. 4. However, as the sweep oscillator frequency becomes equal to the CW oscillator frequency the two will cancel out with a difference frequency of zero at the point 81 in FIG. 4. As the sweep oscillator frequency continues to change, the mirror image of the signal 80 will be produced at 82. Of course, at other frequencies of the sweep oscillator which frequencies are substantially different than the constant frequency of the CW oscillator, the low pass filter 72 will prevent any signal from passing therethrough.

Referring to FIG. 5, the function 85 represents the output of the component 72. Of course, the function 85 is squeezed up with relation to time so that the winged marker 86 is relatively narrow in the horizontal direction. Schematically shown at 87 and 88 in FIG. 3 are shape and size controls for the winged marker of FIG. 4. The shape control 87 merely varies the maximum frequency pass of the component 72. Thus, if it is desired to narrow the marker, the amount of frequency pass is decreased. The control 88 varies the amount of amplification of the marker and thus varies the size of the marker.

Figure 4:
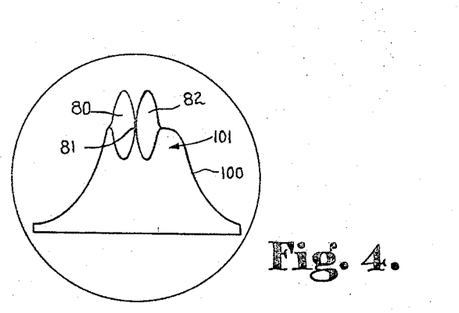
FIG. 4 is an elevational view of a typical scope display showing a winged marker on the response curve of a device under test.

The output 86 of the filter and marker amplifier is fed into an adder 90. The adder 90 also receives the output of the R-F detector 91 whose output is the envelope of the output 92 of the device under test. The output 95 of the adder 90 is coupled to the vertical input 96 of the scope 45. It can be appreciated that the scope presentation will therefore appear as shown in FIG. 4 with the response curve 100 of the device under test having added thereto the marker 101 including the portions 80, 81 and 82. The above described marker system is commercially available.

Figure 6:
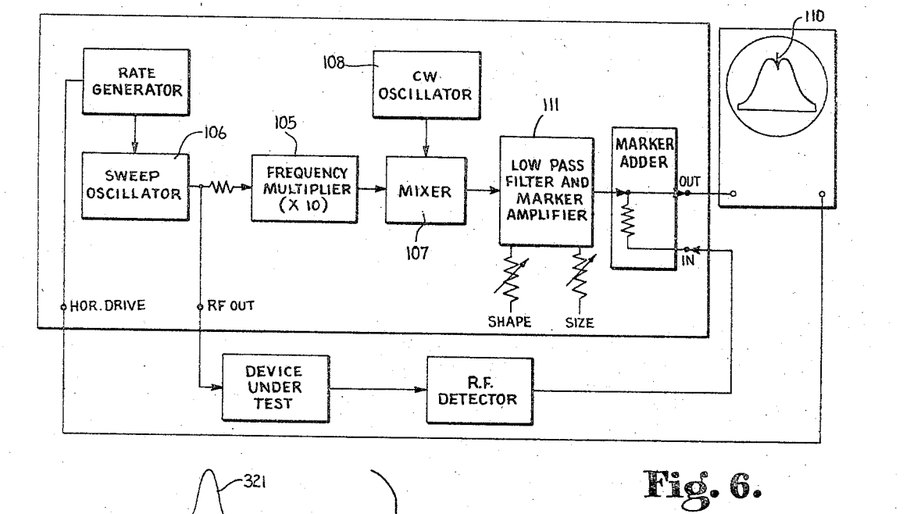
FIG. 6 is a block diagram of a suggested means for narrowing a winged marker.

Referring to FIG. 6, there is illustrated a marker system which is identical to the marker system of FIG. 3 with the exception that a frequency multiplier 105 is coupled into the circuit between the sweep oscillator 106 and the mixer 107. It can be appreciated that the effect of multiplying the frequency of the sample from the sweep oscillator is to cause the variation in frequency which is, for example, 90 to 110 mc. to be increased to 900 to 1,100 mc. This variation in frequency will occur, however, in the same time period, for example, in the same one-sixtieth of a second as mentioned above. In the device of FIG. 6 a CW oscillator 108 is provided which has a constant output frequency variable, for example, from 900 to 1,100 mcs. Assuming that the oscillator 108 frequency is set at 1,000 mcs., the resulting winged marker will be displayed at the center 110 of the oscilloscope trace. The advantage of the arrangement illustrated in FIG. 6 is the narrower marker provided. The narrowing of the marker results from the fact that the frequencies passed by the low pass filter and marker amplifier 111 occur in a smaller or lesser time span. The disadvantage of the arrangement illustrated in FIG. 6 is the fact that the narrowing of the marker is limited by the maximum frequency to which the sweep sample can be multiplied.

Figure 7:
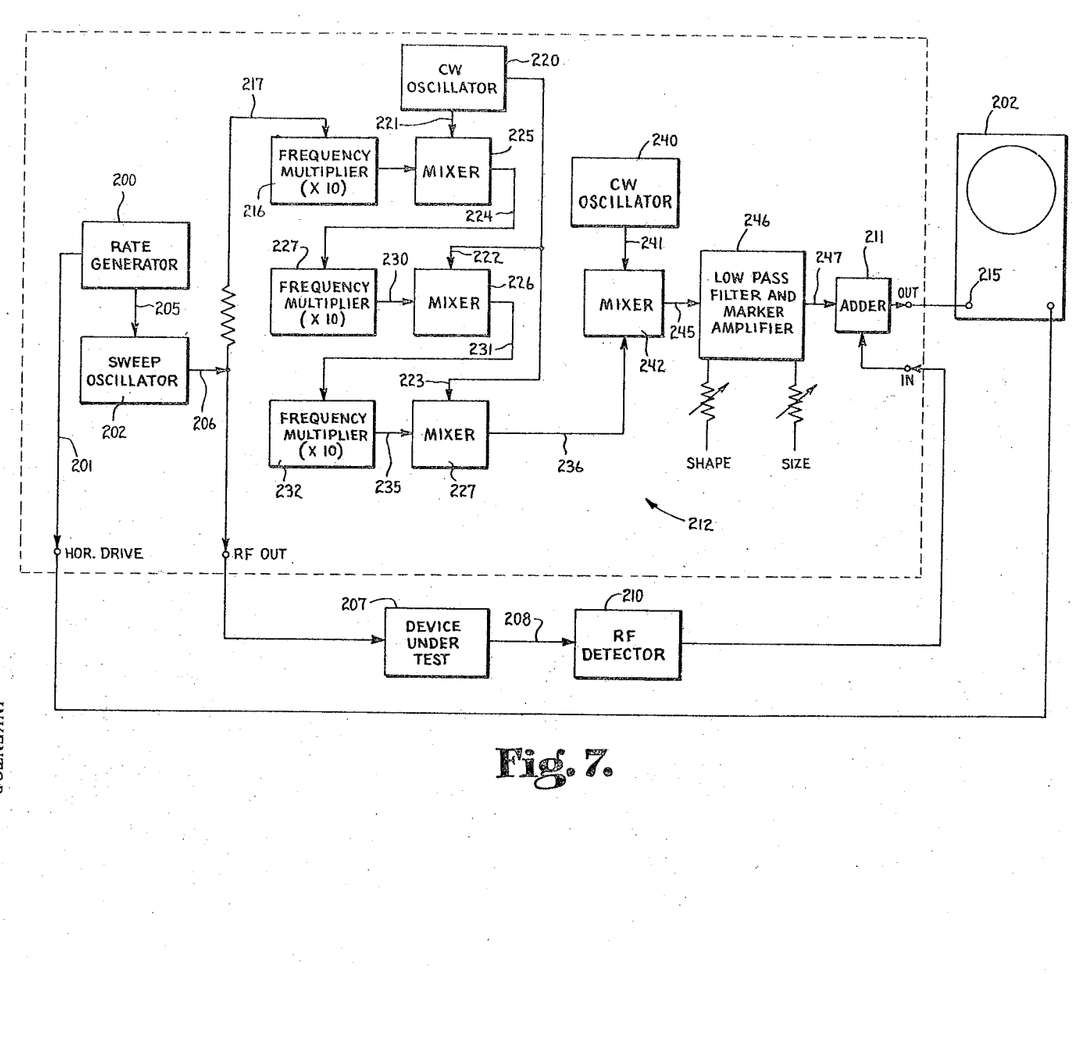
FIG. 7 is a block diagram of a marker system embodying the present invention.

Referring now to FIG. 7, there is illustrated an arrangement which in large part is identical to the arrangements of FIGS. 3 and 6. Thus, there is provided a rate generator 200, one output 201 of which provides the horizontal sweep on the oscilliscope 202. The rate generator 200 also controls the sweep oscillator 202 in the manner described above by the rate generator output 205. The output 206 of the sweep oscillator is fed into the device under test 207 producing a response 208 which is detected by the R-F detector 210 and the envelope fed into the adder 211. The marker is, of course, provided by the components indicated generally at 212. The marker plus the response of the device under test are added in the adder 211 to provide a signal which is coupled to the vertical input 215 for display on the oscilloscope 202.

A sample of the sweep oscillator output is fed into the frequency multiplier 216 at 217. Assuming for purposes of illustration that the input to the frequency multiplier varies from 90 to 91 megacycles, the output of the frequency multiplier will be a uniformly varying frequency with outside limit frequencies of 900 and 910 mc. The CW oscillator 220 is coupled at 221, 222 and 223 to the mixers 225, 226 and 227. In the presently specific embodiment the output frequency of the CW oscillator 220 is 810 megacycles. The difference frequency output 224 of the mixer 225 will be from 90 to 100 mc. and is fed into the frequency multiplier 227 so as to produce an output at 230 varying between 900 and 1,000 mc. The mixer 226 effects a heterodyning action between its two inputs 222 and 230 to produce a difference frequency output 231 varying between 90 and 190 mc. The difference frequency output 231 is multiplied in frequency by the frequency multiplier 232 to produce an output 235 varying between 900 and 1,900 megacycles. The mixer 227 receives as inputs the signals 235 and 223 which are beat together to produce a difference frequency output 236 varying between 90 and 1,090 mc.

The present apparatus further includes a CW oscillator 240 which is capable of producing a constant frequency output variable between 90 and 1,090 mc. The output 241 of the CW oscillator 240 is heterodyned in the mixer 242 against the signal 236 to produce an output 245 which is properly shaped and sized by the low pass filter and marker amplifier 246 to produce a marker output 247. It can be appreciated that the problem presented in the embodiment of FIG. 6 is solved by the embodiment of FIG. 7 because the use of the mixers 225, 226 and 227 keeps the swept frequencies relatively low. The disadvantages of the arrangement of FIG. 7, however, are the difficulties of building a CW oscillator 240 which can cover such a wide frequency range. A further disadvantage is the problem of calibrating the CW oscillator so that its dial properly indicates the frequency (of the response from the device under test) at which the marker is being produced. (It may be desired, for example, to use only one stage 216 and 225 of multiplication and mixing, or two such stages 216, 225, 227, 226, in which case the calibration of the oscillator 240 will be in error.)

Figure 8:
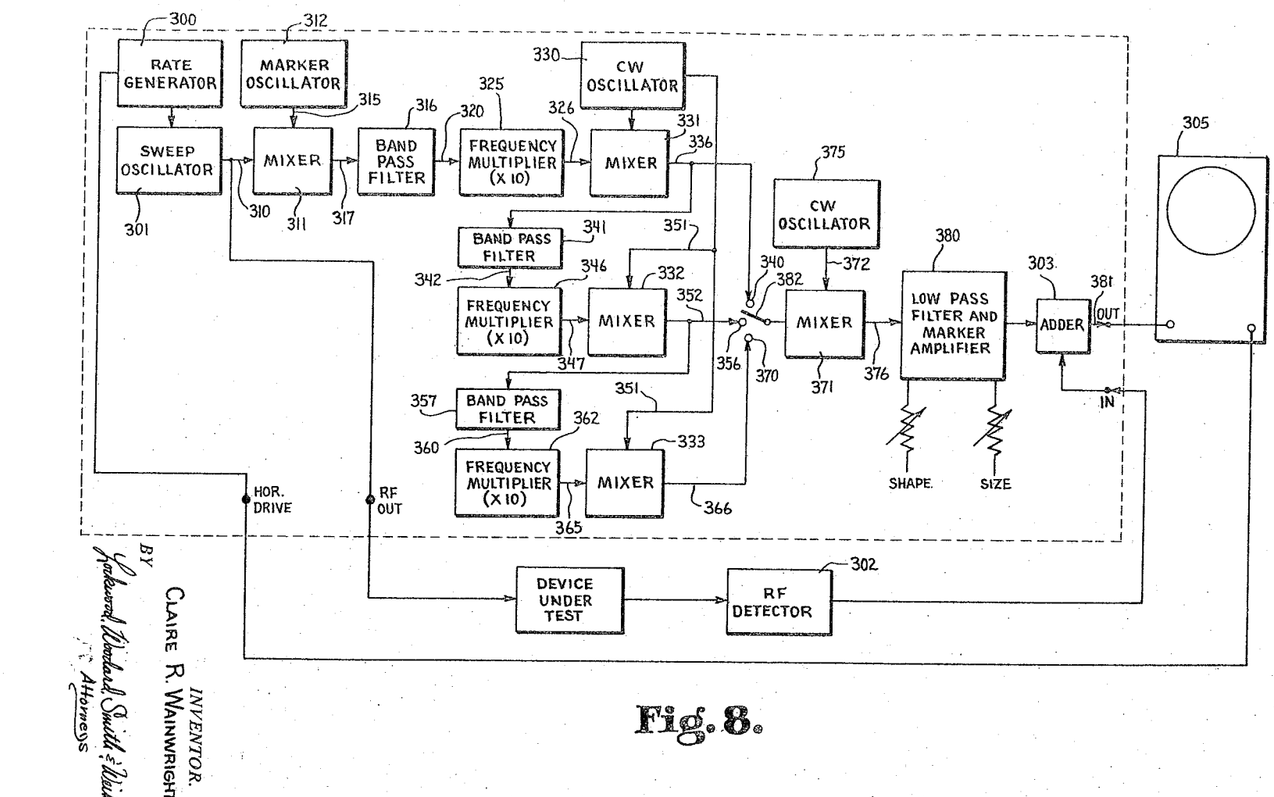
FIG. 8 is a block diagram of a further embodiment of the present invention.

These disadvantages are obviated by the embodiment of FIG. 8.

Referring now to FIG. 8, there is illustrated a marker system which is identical in many respects to the above described marker systems of the FIGS. 3, 6 and 7. The rate generator 300, sweep oscillator 301, R-F detector 302, adder 303 and oscilloscope 305 operate identically to the above described operation. Assuming for the purposes of description that the sweep oscillator has an output varying between 80 and 100 mc., a sample 310 of this output is fed into the mixer 311. A marker oscillator 312 capable of producing a constant frequency which is variable between 90 and 110 mc. is coupled to the mixer 311 for heterodyning of the signal 310. It will be noted that the marker oscillator may be calibrated from zero to 20 mc. said calibration indicating the various frequency positions or locations across the scope in a horizontal direction. For example, in the present embodiment the left side of the scope display represents 80 mc. Since the marker oscillator is calibrated from zero to 20 mc., a zero setting of the marker oscillator would represent a marker at 80 mc., while a 10 setting on the marker oscillator would represent a marker at 90 mc., etc.

Figure 9:
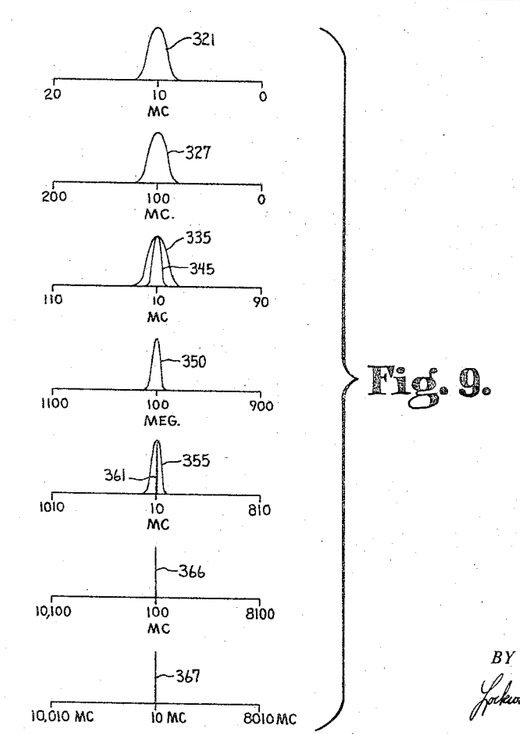
FIG. 9 is a graph showing the output signals of various components forming a part of FIG. 8.

Assuming for the purposes of description that the output 315 of the marker oscillator is 100 mc., a band pass filter 316 receives the output 317 of the mixer. The band pass filter in the present specific embodiment is capable of passing a 1 mc. band width at 10 mc. Thus, the output 320 of the band pass filter appears as shown in the curve 321 in FIG. 9. In other words, the difference frequency output of the mixer 311 is varying from zero to 20 mc. However, the band pass filter 316 is passing only the 10 mc. frequencies with a 1 mc. band width so that the output signal of the band pass filter would appear as shown in 321.

That is the difference frequency is 10 mc. midway along the scale 20 to zero. (This scale also represents the sweep on the oscilloscope face from a time standpoint.) The output 320 is fed into a frequency multiplier 325 which in the present specific embodiment multiplies the frequencies of the signal 320 by ten times to produce an output at 326 as shown in the curve 327 in FIG. 9. Thus, the output 326 has a band width of approximately 10 mc. and is centered at 100 mc. It should be understood that all of the frequency multipliers herein described including the multiplier 325 are conventional transistor vacuum tube or diode devices with exact multiplication being obtainable by locking.

A CW oscillator 330 capable of a 90 mc. output is arranged to feed its output into mixers 331, 332 and 333. The difference frequency of the outputs from the oscillator 330 and the frequency multiplier 325 is illustrated by the curve 335 of FIG. 9. Thus, the center frequency of the band width of the curve 335 is 10 mc. while the band width is 10 mc. The output 336 of the mixer 331 is available directly at the terminal 340 or may be further modified by feeding into a band pass filter 341. In the present specific embodiment the band pass filter 341 is capable of passing a 1 mc. band width at 10 mc. Thus, the output signal 342 of the band pass filter 341 is represented by the curve 345 in FIG. 9 which shows the signal as having a 1 mc. band width and a center frequency of 10 mc.

As can be seen from curve 345, however, the actual width of the curve as compared to the total frequency spread of 110 mc. through zero to 90 mc. is much narrower than the band pass spread of the output 320. The output 342 is fed into a frequency multiplier 346 so as to produce an output 347 as indicated by the curve 350 in FIG. 9. The width of the curve 350 is 10 mc. with the center frequency at 100 mc. The output 347 of the frequency multiplier 346 is heterodyned against the output 351 of the CW oscillator 330 to produce a difference frequency output 352 as represented by the curve 355 in FIG. 9. This difference frequency output is available at the terminal 356 and is also fed into a further band pass filter 357. The band pass filter 357 is capable of a 1 mc. band width at a 10 mc. frequency. Thus, the output 360 of the band pass filter is represented by what appears to be a straight line 361 in FIG. 9 but which if expanded in horizontal dimension would be a curve similar to the curves 321, 327, 345, etc.

Of course, the reason for the narrow appearance of the curve 361 is the fact that it occupies only a 1 mc. horizontal distance in a total frequency variation from 1,010 mc. down through zero to 810 mc. on the other side of zero. The output 360 of the band pass filter 357 is multiplied in frequency by the frequency multiplier 362 to produce an output 365 represented by the line 366 in FIG. 9. This output is heterodyned in the mixer 333 against the 90 mc. signal 351 to produce a difference frequency output 366 as represented by the straight line 367 in FIG. 9. The output 366 is, of course, available at the terminal 370.

Consider now the outputs at the terminals 340, 356 and 370, respectively. First, at the terminal 350 an output represented by the curve 335 is available. This output in a time interval of one-sixtieth of a second provides a pulse half way through the time interval which has a center frequency of 10 mc. and a band width of 10 mc.

At the terminal 356 there is available an output which is identical to the output 340 as regards the center frequency and which is identically positioned relative to the sweep of the sweep oscillator but which is ten times narrower than the pulse available at 340. Similarly, at the terminal 370 there is available a pulse output repeatedly appearing at half way in time through the one-sixtieth of a second sweep interval but having a width one-tenth the width of the pulse available at the terminal 356. Any one of the terminals 340, 356 or 370 can be used for an input to the mixer 371, this input being heterodyned against the output 372 of a constant frequency CW oscillator 375 operating at 10 mc. The difference frequency output 376 is fed into the low band pass filter and marker amplifier 380 where the shape and size of the winged marker can be adjusted in the manner above described. The marker output 381 is then fed into the adder 303 where it is added to the response of the device under test for display on the oscilloscope 305. It can be appreciated that the various frequency multiplier mixer combinations together with the switch 382 connectable to the various terminals 340, 356 and 370 make possible in a single instrument winged markers of varying frequency widths. It can also be appreciated that the location of the marker along the oscilloscope sweep scale from left to right or vice versa can be adjusted by adjusting the frequency of the marker oscillator which has a calibration proper for use of all of the terminals 340, 356 and 370.

It should be understood that various modifications can be made in circuitry of FIG. 8 without departing from the spirit of the invention. For example, each of the mixers 331, 332 and 333 might provide with an output filter which to an extent accomplishes the same action as the band pass filters 341 and 357. Various other such modifications can be conceived by one skilled in the art with a further example being the provision of additional multiplier mixer stages. Still another such modification which could be made in all of the above described circuitry might be the use of 60 cycle line rate in place of the disclosed rate generator.

It will be evident from the above description that the present invention provides an improved sweep generator and also provides an improved marker system for a sweep generator. It will also be evident from the above description that the present invention provides a sweep generator marker system having substantial accuracy throughout a wide range of sweep widths and frequencies.

It should also be mentioned that the marker system of the present invention can be adapted to improve the accuracy of pulse markers as well as winged markers. The use of the same multiplier techniques as described above to sharpen trigger pulses for a pulse type marker system would decrease the marker error due to multivibrator trigger delay. Also, 10 mc. pulses could be obtained which would be more accurate and have sharper configurations because of the inclusion of this invention. Of course, fixed markers or harmonically-spaced markers could also be narrowed by the techniques of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A marker system including an oscilloscope wherein the marker signal occupies a reduced portion of the oscilloscope display comprising a sweep oscillator, a rate generator coupled to said sweep oscillator and adapted for coupling to the horizontal input of an oscilloscope, an RF output terminal for said sweep oscillator adapted to be coupled to a device under test, a marker oscillator capable of oscillating at a constant frequency which is adjustable throughout a range equal to the difference between the highest and lowest frequencies through which said sweep oscillator sweeps, a mixer receiving the output of said marker oscillator and the output of said sweep oscillator for heterodyning the two last mentioned outputs to produce a difference frequency signal output, a band pass filter arranged to pass a narrow band of frequencies, said filter having a center frequency corresponding to the difference frequency when the frequncey output of said sweep oscillator is coincident the selected marker frequency, means for multiplying the output of said band pass filter, a first constant frequency oscillator, means for mixing said multiplied output and the output of said first constant frequency oscillator to produce a difference frequency output the same as the output frequency of said band pass filter, a second constant frequency oscillator having the same frequency as the center frequency of the output of said band pass filter, a third mixer receiving the output of said second constant frequency oscillator and said multiplied and mixed output for heterodyning thereof to produce a difference frequency signal output, a low pass filter and amplifier receiving the output of said further mixer and passing only low frequencies to produce a marker, and an adder receiving the output of said filter amplifier and adapted to receive the detected output of the device under test for adding the two last mentioned outputs together and supplying them to the vertical input of said oscilloscope.

2. A marker system including an oscilloscope wherein the marker signal occupies a reduced portion of the oscilloscope display comprising a sweep oscillator, a rate generator coupled to said sweep oscillator and adapted for coupling to the horizontal input of said oscilloscope, an RF output terminal for said sweep oscillator adapted to be coupled to a device under test, a marker oscillator capable of oscillating at a constant frequency which is adjustable throughout a range equal to the difference between the highest and lowest frequencies through which said sweep oscillator sweeps, a mixer receiving the output of said marker oscillator and the output of said sweep oscillator for heterodyning the two last mentioned outputs to produce a difference frequency signal output, a band pass filter arranged to pass a narrow band of frequencies, said filter having a center frequency corresponding to the difference frequency when the frequency output of said sweep oscillator is coincident the selected marker frequency, a first constant frequency oscillator, means for repeatedly multiplying, mixing with the output of said first oscillator and band pass filtering the output of said band pass filter to produce a plurality of difference frequency output bands occupying progressively narrower portions of the sweep width of said sweep oscillator having the same center frequency as said band pass filter output, a second constant frequency oscillator having the same frequency as the center frequency of the output of said band pass filter, a third mixer receiving the output of said second constant frequency oscillator and one of said multiplied and mixed down outputs for heterodyning thereof to produce a difference frequency signal output, a low pass filter and amplifier receiving the output of said further mixer and passing only low frequencies to produce a marker, and an adder receiving the output of said filter amplifier and adapted to receive the detected output of the device under test for adding the two last mentioned outputs together and supplying them to the vertical input of said oscilloscope.

3. A marker system including an oscilloscope wherein the marker signal occupies a reduced portion of the oscilloscope display comprising a sweep oscillator, a rate generator coupled to said sweep oscillator and adapted for coupling to the horizontal input of said oscilloscope, an RF output terminal for said sweep oscillator adapted to be coupled to a device under test, a marker oscillator capable of oscillating at a constant frequency which is adjustable throughout a range equal to the difference between the highest and lowest frequencies through which said sweep oscillator sweeps, a mixer receiving the output of said marker oscillator and the output of said sweep oscillator for heterodyning the two last mentioned outputs to produce a difference frequency signal output, a band pass filter arranged to pass a narrow band of frequencies, said filter having a center frequency corresponding to the difference frequency when the frequency output of said sweep oscillator is coincident the selected marker frequency, a frequency multiplier receiving the output of said band pass filter and adapted to frequency multiply said filter output to provide a multiplier output signal with an enlarged frequency spread, a first constant frequency oscillator, a second mixer and lower side band down converter receiving the output of said first constant frequency oscillator and the output of said frequency multiplier for heterodyning the two last mentioned outputs to produce a difference frequency signal output, said first constant frequency oscillator operable at such a frequency that the center frequency of the second mixer output band of frequencies is the same as the center frequency of the output of said band pass filter, a second constant frequency oscillator operable at the same frequency as said center frequency, a further mixer receiving the output of said second constant frequency oscillator and said second mixer for heterodyning thereof to produce a difference frequency signal output, a low pass filter and amplifier receiving the output of said further mixer and passing only low frequencies to produce a marker, and an adder receiving the output of said filter amplifier and adapted to receive the detected output of the device under test for adding the two last mentioned outputs together and supplying them to the vertical input of said oscilloscope.

4. A marker system including an oscilloscope wherein the marker signal occupies a reduced portion of the oscilloscope display comprising a sweep oscillator, a rate generator coupled to said sweep oscillator and adapted for coupling to the horizontal input of said oscilloscope, an RF output terminal for said sweep oscillator adapted to be coupled to a device under test, a marker oscillator capable of oscillating at a constant frequency which is adjustable throughout a range equal to the difference between the highest and lowest frequencies through which said sweep oscillator sweeps, a mixer receiving the output of said marker oscillator and the output of said sweep oscillator for heterodyning the two last mentioned outputs to produce a difference frequency signal output, a first band pass filter arranged to pass a narrow band of frequencies, said filter having a center frequency corresponding to the difference frequency when the frequency output of said sweep oscillator is coincident the selected marker frequency, a frequency multiplier receiving the output of said band pass filter and adapted to frequency multiply said filter output to provide a multiplier output signal with an enlarged frequency spread, a first constant frequency oscillator, a second mixer and lower side band down converter receiving the output of said first constant frequency oscillator and the output of said frequency multiplier for heterodyning the two last mentioned outputs to produce a difference frequency signal output, said first constant frequency oscillator operable at such a frequency that the center frequency of the second mixer output band of frequencies is the same as the center frequency of the output of said band pass filter, a second band pass filter arranged to pass the same center frequency as said first band pass filter and receiving the output of said second mixer, a second frequency multiplier arranged to receive and multiply the output of said second band pass filter, a third mixer and lower side band down converter receiving the output of said first constant frequency oscillator and the output of said second frequency multiplier for heterodyning the two last mentioned outputs to produce a difference frequency signal output, a third band pass filter arranged to pass the same center frequency as said first band pass filter and receiving the output of said second mixer, a third frequency multiplier arranged to receive and multiply the output of said third band pass filter, a fourth mixer and lower side band down converter receiving the output of said first constant frequency oscillator and the output of said third frequency multiplier for heterodyning the two last mentioned outputs to produce a difference frequency signal output, a second constant frequency oscillator operable at the same frequency as said center frequency, a further mixer receiving the output of said third constant frequency oscillator operable, means for selectively connecting the output of said second mixer, said third mixer or said fourth mixer to said further mixer for heterodyning thereof to produce a difference frequency signal output, a low pass filter and amplifier receiving the output of said further mixer and passing only low frequencies to produce a marker, and an adder receiving the output of said filter amplifier and adapted to receive the detected output of the device under test for adding the two last mentioned outputs together and supplying them to the vertical input of said oscilloscope.

5. A marker system including an oscilloscope wherein the marker signal occupies a reduced portion of the oscilloscope display comprising a sweep oscillator, a rate generator coupled to said sweep oscillator and adapted for coupling to the horizontal input of said oscilloscope, an RF output terminal for said sweep oscillator adapted to be coupled to a device under test, a marker oscillator capable of oscillating at a constant frequency which is adjustable throughout a range equal to the difference between the highest and lowest frequencies through which said sweep oscillator sweeps, a mixer receiving the output of said marker oscillator and the output of said sweep oscillator for heterodyning the two last mentioned outputs to produce a difference frequency signal output, a first band pass filter arranged to pass a narrow band of frequencies, said filter having a center frequency corresponding to the difference frequency when the frequency output of said sweep oscillator is coincident the selected marker frequency, a frequency multiplier receiving the output of said band pass filter and adapted to frequency multiply said filter output to provide a multiplier output signal with an enlarged frequency spread, a first constant frequency oscillator, a second mixer and lower side band down converter receiving the output of said first constant frequency oscillator and the output of said frequency multiplier for heterodyning the two last mentioned outputs to produce a difference frequency signal output, said first constant frequency oscillator operable at such a frequency that the center frequency of the second mixer output band of frequencies is the same as the center frequency of the output of said band pass filter, a second band pass filter arranged to pass the same center frequency as said first band pass filter and receiving the output of said second mixer, a second frequency multiplier arranged to receive and multiply the output of said second band pass filter, a third mixer and lower side band down converter receiving the output of said first constant frequency oscillator and the output of said second frequency multiplier for heterodyning the two last mentioned outputs to produce a difference frequency signal output, a third band pass filter arranged to pass the same center frequency as said first band pass filter and receiving the output of said second mixer, a third frequency multiplier arranged to receive and multiply the output of said third band pass filter, a fourth mixer and lower side band down converter receiving the output of said first constant frequency oscillator and the output of said third frequency multiplier for heterodyning the two last mentioned outputs to produce a difference frequency signal output, a second constant frequency oscillator operable at the same frequency as said center frequency, a further mixer receiving the output of said third constant frequency oscillator, means for selectively connecting the output of said second mixer, said third mixer or said fourth mixer to said further mixer for heterodyning thereof to produce a difference frequency signal output, a low pass filter and amplifier receiving the output of said further mixer and passing only low frequencies to produce a marker, and an adder receiving the output of said filter amplifier and adapted to receive the detected output of the device under test for adding the two last mentioned outputs together and supplying them to the vertical input of said oscilloscope.

6. A marker system including an oscilloscope wherein the marker signal occupies a reduced portion of the oscilloscope display comprising a sweep oscillator, a rate generator coupled to said sweep oscillator and adapted for coupling to the horizontal input of an oscilloscope, an RF output terminal for said sweep oscillator adapted to be coupled to a device under test, a frequency multiplier coupled for receiving a sample of the output of said sweep oscillator and adapted to multiply said sample to provide a multiplier output signal with an enlarged frequency spread, a first constant frequency oscillator, a mixer and lower side band down converter receiving the output of said constant frequency oscillator and the output of said frequency multiplier for heterodyning the two last mentioned outputs to produce a first difference frequency signal output, a second mixer and lower side band down converter receiving said first difference frequency signal output and the output of said constant frequency oscillator for heterodyning the two last mentioned outputs to produce a second difference frequency signal output, a third mixer and lower side band down converter receiving said second difference frequency signal output and the output of said constant frequency oscillator for heterodyning the two last mentioned outputs to produce a third difference frequency signal output, a further constant frequency oscillator with its output frequency adjustable between the maximum and minimum frequencies of said third difference frequency signal output, a further mixer receiving the output of said further oscillator and the output of said first mixer for heterodyning the two last mentioned outputs to produce a fourth difference frequency signal output, a low pass filter and amplifier receiving the output of said further mixer and passing only low frequencies to produce a marker, and an adder receiving the output of said filter amplifier and adapted to receive the detected output of the device under test for adding the two last mentioned outputs together and supplying them to the vertical input of said oscilloscope.

7. In a marker system including a sweep oscillator and means coupled to the output of the sweep oscillator to provide a recurrent marker signal occurring coincident with passage of the sweep output of said sweep oscillator through a given frequency, the improvement which comprises means for narrowing said marker signal to occupy a reduced portion of the sweep width of said sweep oscillator, said last mentioned means comprising a frequency multiplier arranged to multiply said recurrent marker signal to spread it across a broader frequency band in the same time span, means for mixing down said multiplied signal to provide a difference frequency output having a lower frequency range than said multiplied signal but sweeping across the same broad frequency band, and a band pass filter receiving the difference frequency output and passing only a portion thereof to provide a signal which occupies a shorter time span than said first mentioned signal.

8. A marker system for a sweep generator having a sweep oscillator which supplies a varying frequency sweep signal to the device under test, said marker system generating a marker signal which occupies a reduced portion of the sweep width of said sweep oscillator, said marker system comprising
  means for selecting the frequncy of said marker signal, said means producing a signal whose frequency corresponds to the frequency of said marker signal,
  means coupled to said sweep oscillator and said signal produced by said means for selecting a marker frequency for multiplying those frequencies proximate the selected marker frequency for producing said marker signal with a frequency spectrum which is substantially wider than the portion of the sweep width of said sweep oscillator occupied by said marker signal, and
  means for combining said marker signal with the response of the device under test to the varying frequency signal supplied by said sweep oscillator.

9. A marker system for a sweep generator having a sweep oscillator which supplies a varying frequency sweep signal to the device under test, said marker system generating a marker signal which occupies a reduced portion of the sweep width of said sweep oscillator, said marker system comprising
  first means for selecting a marker frequency,
  second means responsive to said first means and to said sweep oscillator for providing a recurrent signal corresponding to a selected portion of the output of said sweep oscillator,
  third means responsive to said second means for widening the frequency spectrum of said recurrent signal to produce said marker signal occupying a reduced portion of the sweep width of the sweep generator, and
  fourth means for summing said marker signal and the detected output response of the device under test to the varying frequency signal supplied by said sweep oscillator.

10. A system for increasing the frequency spectrum of a marker signal for a sweep generator having a sweep oscillator comprising
  means for selecting a marker frequency comprising a marker oscillator having a selectively variable frequency output,
  means for widening the frequency spectrum of a selected portion of the output of said sweep oscillator comprising
    a mixer coupled to said sweep oscillator and said marker oscillator for producing a difference frequency signal of predetermined frequency when the sweep frequency coincides with the selected marker frequency,
    a band pass filter coupled to the output of said mixer whose center frequency is equal to said predetermined difference frequency, and
    frequency multiplier means coupled to the output of said band pass filter, and means coupled to the output of said frequency multiplier for frequency mixing said multiplied signal and recovering the resulting lower side band.

11. The marker system of claim 10, comprising plural additional multiplier and frequency mixer stages for progressively increasing the frequency spectrum contained by said recurrent marker signal.

12. A marker system for a sweep generator having a sweep oscillator which supplies a varying frequency sweep signal to the device under test, said marker system generating a marker signal which occupies a reduced portion of the sweep width of said sweep oscillator, said marker system comprising a marker oscillator for selecting marker frequencies, means for mixing the output of said sweep oscillator and said marker oscillator to provide a recurrent signal corresponding to a preselected narrow portion of each sweep signal of said sweep oscillator, the frequency spectrum of said recurrent signal corresponding to the frequencies contained in said preselected portion of the sweep signal, means for frequency multiplying said recurrent signal for producing said marker signal, said marker signal containing a spectrum of frequencies which is substantially increased above the frequency spectrum within said preselected portion of the sweep signal so that for a marker signal of any given frequency spectrum, said marker signal occupies a substantially narrower portion of the sweep width of said sweep oscillator, and means for combining said marker signal with the response of the device under test to the varying frequency signal supplied by said sweep oscillator.

13. The marker system of claim 12 wherein said means for frequency multiplying said recurrent signal comprises plural multiplier and frequency mixer stages for progressively increasing the frequency spectrum contained by said recurrent marker signal.

14. The marker system of claim 12 comprising means for selectively varying the portion of the sweep width occupied by said marker signal comprising means for selectively coupling additional multiplier and frequency mixer stages to said recurrent signal.

References Cited

UNITED STATES PATENTS

| | | | |
|---|---|---|---|
| 2,324,077 | 7/1943 | Goodale et al. | 324—79 |
| 2,337,328 | 12/1943 | Hathaway | 324—79 |
| 2,627,033 | 1/1953 | Jensen et al. | 324—79 |
| 2,859,343 | 11/1958 | Langford et al. | 324—57 XR |
| 2,920,271 | 1/1960 | Bryden | 324—57 |
| 2,987,586 | 6/1961 | Berger | 179—175.3 |
| 2,657,307 | 10/1963 | Balde et al. | 324—57 X |

RUDOLPH V. ROLINEC, *Primary Examiner.*

E. E. KUBASIEWICZ, *Assistant Examiner.*

U.S. Cl. X.R.

324—77; 328—189

UNITED STATES PATENT OFFICE
CERTIFICATE OF CORRECTION

Patent No. 3,427,536                                                                           February 11, 1969

Claire R. Wainwright

It is certified that error appears in the above identified patent and that said Letters Patent are hereby corrected as shown below:

Column 7, line 21, "350" should read -- 340 --. Column 10, line 40, cancel "operable". Column 13, line 2, "couplied" should read -- coupled --. Column 10, line 51, beginning with "A marker system" cancel all to and including "oscilloscope." in line 37, column 11 and insert instead:

A marker system including an oscilloscope wherein the marker signal occup a reduced portion of the oscilloscope display comprising a sweep oscillator, a rate generator coupled to said sweep oscillator and adapted for coupling to the horizontal input of an oscilloscope, an RF output terminal for said sweep oscillator adapted to be coupled to a device under test, a frequency multiplie coupled for receiving a sample of the output of said sweep oscillator and adapted to multiply said sample to provide a multiplier output signal with an enlarged frequency spread, a first constant frequency oscillator, a mixer and lower side band down converter receiving the output of said constant frequency oscillator and the output of said frequency multiplier for heterodyning the two last mentioned outputs to produce a difference frequency signal output, a further constant frequency oscillator with its output frequency adjustable between the maximum and minimum frequencies of said difference frequency signal output, a further mixer receiving the output of said further oscillator and the output of said first mixer for heterodyning the two last mentioned outputs to produce a second difference frequency signal output, a low pass filter and amplifier receiving the output of said further mixer and passing only low frequencies to produce a marker, and an adder receiving the output of said filter amplifier and adapted to receive the detected output of the device under test for adding the two last mentioned outputs together and supplying them to the vertical input of said oscilloscope.

Signed and sealed this 7th day of April 1970.

(SEAL)
Attest:

EDWARD M. FLETCHER, JR.                                              WILLIAM E. SCHUYLER, JR.
Attesting Officer                                                                Commissioner of Patents